(12) United States Patent
Britton

(10) Patent No.: US 10,266,433 B2
(45) Date of Patent: Apr. 23, 2019

(54) REACTOR FOR PRECIPITATING SOLUTES FROM WASTEWATER AND ASSOCIATED METHODS

(75) Inventor: Ahren Britton, Lithia, FL (US)

(73) Assignee: Ostara Nutrient Recovery Technologies Inc., Vancouver (CA)

( * ) Notice: Subject to any disclaimer, the term of this patent is extended or adjusted under 35 U.S.C. 154(b) by 480 days.

(21) Appl. No.: 14/003,777

(22) PCT Filed: Mar. 9, 2012

(86) PCT No.: PCT/CA2012/050144
§ 371 (c)(1),
(2), (4) Date: Sep. 6, 2013

(87) PCT Pub. No.: WO2012/119260
PCT Pub. Date: Sep. 13, 2012

(65) Prior Publication Data
US 2013/0334144 A1    Dec. 19, 2013

Related U.S. Application Data

(60) Provisional application No. 61/451,518, filed on Mar. 10, 2011.

(51) Int. Cl.
*C02F 1/52* (2006.01)
*C01B 25/28* (2006.01)
(Continued)

(52) U.S. Cl.
CPC ............ *C02F 1/5236* (2013.01); *C01B 25/28* (2013.01); *C01B 25/32* (2013.01); *C02F 1/5281* (2013.01);
(Continued)

(58) Field of Classification Search
CPC .................................................... C02F 1/5236
See application file for complete search history.

(56) References Cited

U.S. PATENT DOCUMENTS

| | | | |
|---|---|---|---|
| 3,747,764 A | 7/1973 | Graham et al. | |
| 4,389,317 A | 6/1983 | Trentelman | |

(Continued)

FOREIGN PATENT DOCUMENTS

| | | | |
|---|---|---|---|
| CA | 1226420 A1 | 9/1987 | |
| CA | 2135161 A1 | 11/1993 | |

(Continued)

OTHER PUBLICATIONS

European Patent Office, Supplementary European Search Report, dated Dec. 5, 2014, European Patent Application No. 12755256.0.

(Continued)

*Primary Examiner* — Peter Keyworth
(74) *Attorney, Agent, or Firm* — Klarquist Sparkman, LLP

(57) ABSTRACT

Apparatus and methods for removing solutes from wastewater are disclosed. An embodiment provides a reactor tank having a manifold located at or near an interface between a lower (upstream) section having a first cross-section and a higher (downstream) section having a second cross-section smaller than the first cross section. An inlet for wastewater to enter the reactor tank is located in or below the first cross-section. A recycling path is provided for removing wastewater from the manifold and recycling at least part of the removed wastewater into the reactor tank. An outlet for water to exit the reactor tank is located downstream from the manifold.

23 Claims, 11 Drawing Sheets

(51) Int. Cl.
| | |
|---|---|
| *C01B 25/32* | (2006.01) |
| *C02F 1/00* | (2006.01) |
| *C02F 1/66* | (2006.01) |
| *C02F 101/10* | (2006.01) |
| *C02F 103/00* | (2006.01) |
| *C02F 103/06* | (2006.01) |
| *C02F 103/10* | (2006.01) |
| *C02F 103/20* | (2006.01) |

(52) U.S. Cl.
CPC ............... *C02F 1/006* (2013.01); *C02F 1/66* (2013.01); *C02F 2101/105* (2013.01); *C02F 2103/001* (2013.01); *C02F 2103/06* (2013.01); *C02F 2103/10* (2013.01); *C02F 2103/20* (2013.01); *C02F 2209/40* (2013.01); *C02F 2301/046* (2013.01)

(56) References Cited

U.S. PATENT DOCUMENTS

| | | | |
|---|---|---|---|
| 4,743,376 A | 5/1988 | Elmaleh et al. | |
| 4,798,131 A * | 1/1989 | Ohta | B01D 9/0013 366/307 |
| 4,869,815 A | 9/1989 | Bernard et al. | |
| 6,495,050 B1 * | 12/2002 | Nomura | C02F 1/5236 210/712 |
| 7,622,047 B2 | 11/2009 | Koch et al. | |
| 2008/0257826 A1 * | 10/2008 | Koch | B01D 9/005 210/709 |

FOREIGN PATENT DOCUMENTS

| | | |
|---|---|---|
| CN | 1964921 A | 5/2007 |
| CN | 101817581 A | 9/2010 |
| JP | 11-267665 A2 | 10/1999 |
| WO | WO 85/00119 | 1/1985 |
| WO | WO 94/00411 | 1/1994 |
| WO | WO 2005/077834 | 8/2005 |
| WO | 2011021148 A1 | 2/2011 |

OTHER PUBLICATIONS

State Intellectual Property Office of the People's Republic of China, Notification of the Second Office Action, issued in corresponding Chinese Application No. 201280020011.5, with English Translation, dated May 12, 2015, 22 pages.

Regy et al., Phosphate recovery by struvite precipitation in a stirred reactor, LAGEP (Mar. to Dec. 2001).

Piekema et al., Phosphate Recovery by the Crystallization Process: Experience and Developments, paper presented at the 2nd International Conference on Phosphate Recovery for Recycling from Sewage and Animal Wastes, Noordwijkerhout, the Netherlands, Mar. 12-13, 2001.

Ueno et al., "Three years experience on operating and selling recovered struvite from full scale plant", Environmental Technology, v. 22, p. 1373-1381, 2001.

State Intellectual Property Office of the People's Republic of China, Notification of the First Office Action, dated Aug. 26, 2014, issued in Chinese Application for Invention No. 201280020011.5 (partial English translation).

European Patent Office, Communication pursuant to Article 94(2) EPC, dated Jun. 28, 2017, issued in European Patent Application No. 12755256.0, 7 pages.

* cited by examiner

REACTOR FOR PRECIPITATING SOLUTES FROM WASTEWATER AND ASSOCIATED METHODS

CROSS-REFERENCE TO RELATED APPLICATIONS

This application claims priority from U.S. Patent Application No. 61/451,518 filed 10 Mar. 2011 entitled REACTOR FOR PRECIPITATING SOLUTES FROM WASTEWATER. For purposes of the United States of America, this application claims the benefit under 35 U.S.C. § 119 of U.S. Patent Application No. 61/451,518 filed 10 Mar. 2011 which is hereby incorporated herein by reference.

TECHNICAL FIELD

The invention relates to wastewater treatment. Embodiments relate to reactors for precipitating dissolved materials from wastewater and methods for precipitating dissolved materials from wastewater. For example, the invention may be applied in struvite precipitation reactors.

BACKGROUND

Reactors in general and fluidized bed reactors in particular have been used to remove and recover phosphorous from wastewater that contains significant concentrations of phosphorus, often in the form of phosphate. Such wastewater may come from a wide range of sources. These include sources such as leaching from landfill sites, runoff from agricultural land, effluent from industrial processes, municipal wastewater, animal wastes, and the like. Such wastewater, if released into the environment without treatment, can result in excess effluent phosphorus levels.

Various phosphorus removal and recovery technologies exist. Some of the technologies provide fluidized bed reactors for removing phosphorus from aqueous solutions by producing struvite ($MgNH_4PO_4 \cdot 6H_2O$) or struvite analog or a phosphate compound in the form of pellets. Struvite can be formed by the reaction:

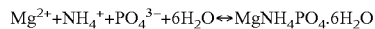

$$Mg^{2+} + NH_4^+ + PO_4^{3-} + 6H_2O \leftrightarrow MgNH_4PO_4 \cdot 6H_2O$$

Examples of reactors used to remove and recover phosphorus from wastewater solutions have been described in various references. They include the following:

Regy et al., *Phosphate recovery by struvite precipitation in a stirred reactor*, LAGEP (March to December 2001) includes a survey of various attempts to remove phosphorus and nitrogen from wastewater by struvite precipitation.

Trentelman, U.S. Pat. No. 4,389,317 and Piekema et al., *Phosphate Recovery by the Crystallization Process: Experience and Developments*, paper presented at the 2nd International Conference on Phosphate Recovery for Recycling from Sewage and Animal Wastes, Noordwijkerhout, the Netherlands, Mar. 12-13, 2001, disclose a reactor and method for precipitating phosphate in the form of calcium phosphate, magnesium phosphate, magnesium ammonium phosphate or potassium magnesium phosphate.

Ueno et al., *Three years experience on operating and selling recovered struvite from full scale plant* (2001), Environmental Technology, v. 22, p. 1373, discloses the use of sidestream crystallization reactors to remove phosphate in the form of magnesium ammonium phosphate (also known as struvite).

Tsunekawa et al., Patent Abstracts of Japan No. 11-267665 discloses a reactor for removing phosphorus from water.

Koch et al., Fluidized bed wastewater treatment, U.S. Pat. No. 7,622,047.

Some problems that may occur in wastewater treatment and reactors include insufficient precipitation of solutes in treated wastewater and entrainment of precipitate particles in treated wastewater. There is a need for cost-effective methods and systems to address some or all of these problems.

SUMMARY OF THE INVENTION

This invention has a number of aspects. One aspect provides fluidized bed reactors and components thereof. Such reactors may, for example, be applied in production of struvite, struvite analogs and other phosphorus-containing compounds from wastewater. Another aspect provides methods for wastewater treatment. Various examples of such apparatus and methods are described herein and illustrated in the accompanying drawings. The features of the various illustrated example embodiments may be combined in other ways to provide further example embodiments.

One example aspect provides a fluidized bed reactor having a clarifying section upstream from an outlet. The clarifying section is configured to provide a low fluid velocity. The clarifying section thereby helps to keep small particles of struvite or the like from exiting the reactor. Fluid velocities in at least one section below the clarifying section are higher than fluid velocities in the clarifying section. Fluid velocities in the clarifying section are reduced by removing fluid before the fluid enters the clarifying section. This may involve drawing the fluid into a manifold or the like at or near a lower boundary of the clarifier section. Withdrawn fluid may be partially or entirely recycled into a section of the reactor below the clarifying section. In some embodiments, a cross sectional area of the clarifying section is smaller than a cross sectional area of one or more sections below the clarifying section in which fluid velocities are greater than fluid velocities within the clarifying section.

Another aspect provides a wastewater treatment system comprising: a reactor tank tapered from a first cross-section to a second cross-section smaller than the first cross-section. The first cross-section is above the second cross-section. An inlet is provided for wastewater to enter the reactor tank below or near the bottom of the second cross-section. A recycling path is arranged to take in wastewater from an intake downstream from the first cross-section and to return at least part of the removed wastewater into the reactor tank upstream from the intake. An outlet for water to exit the reactor tank is provided downstream from the recycling path intake. A clarifying section may be provided between the intake to the recycling path and the outlet.

In some embodiments a flow distributor is configured to collect wastewater from the reactor tank and deliver it to the intake. The flow distributor may be configured to cause wastewater drawn by the intake to be drawn substantially uniformly from a cross-section of the reactor tank. The flow distributor may comprise, for example, a manifold, a launder, a horizontal flow distribution plate and a submerged weir located vertically below the flow distribution plate or the like.

Some embodiments comprise a metering mechanism connected to mix a reagent with the incoming wastewater. The reagent may, for example, comprise a source of one or more of: magnesium ions and ammonium ions.

Another aspect provides methods for treating wastewater. The methods according to this aspect comprise: flowing wastewater from an inlet of a reactor tank upwardly through the reactor tank; reducing the velocity of wastewater flowing downstream of the inlet; removing reduced velocity wastewater upstream of an outlet of the reactor tank; and reintroducing removed wastewater to the reactor tank upstream of where the removed wastewater is removed.

Other aspects provide apparatus comprising any new, inventive feature, combination of features or sub-combination of features disclosed herein and methods comprising any new, inventive step, act, combination of steps and/or acts or sub-combination of steps and/or acts described herein.

Further aspects of the invention and features of example embodiments of the invention are described below and/or illustrated in the accompanying drawings.

BRIEF DESCRIPTION OF THE DRAWINGS

The accompanying drawings illustrate non-limiting embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Some embodiments of the invention in the following description relate to reactor apparatus or methods wherein phosphorus in wastewater is precipitated in the form of struvite or struvite analogs or a phosphate compound. This choice of example coincides with embodiments having significant commercial utility. The scope of the invention, however, is not limited to these examples.

For convenience, the term "wastewater" is used in the following description and claims to describe aqueous solutions such as industrial and municipal wastewater, leachate, runoff, animal wastes, effluent or the like. The term "wastewater" is not limited to effluent from municipal sewage, animal waste, or any other specific source. Some embodiments provide methods for treating municipal sewage and/or animal waste. Some embodiments provide methods and apparatus for treating other kinds of wastewater, such as mine tailings or the like. The apparatus and methods described herein are not limited to treating wastewater but have other applications as well. The apparatus and methods may be applied to precipitate materials such as, for example, struvite, struvite analogs or other phosphate-containing compounds from solutions of their constituent ions obtained from sources other than wastewater.

Figure 1:
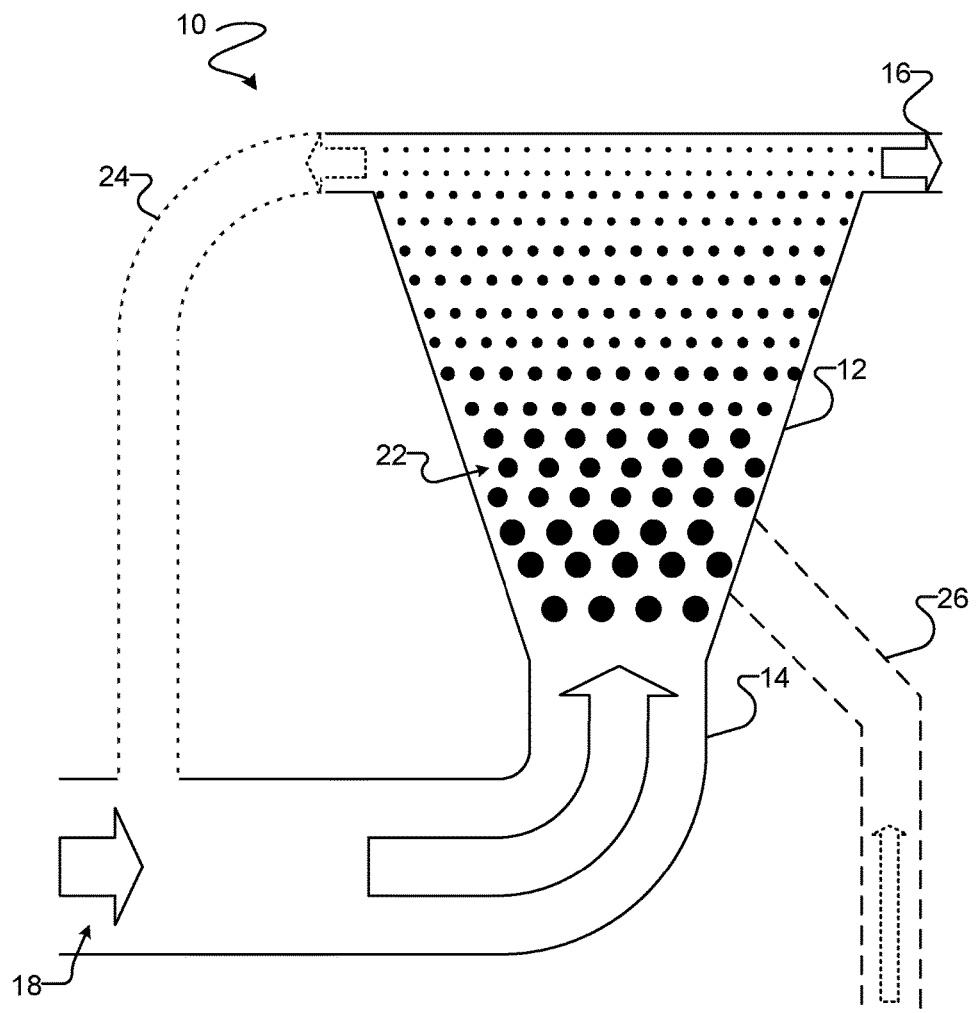
FIG. 1 is a side elevation cross-section view of a tapered fluidized-bed reactor according to an example embodiment.

FIG. 1 is a diagram schematically illustrating a tapered fluidized-bed reactor 10 according to an example embodiment that may be used for precipitating dissolved solids from wastewater. Reactor 10 comprises a tapered reaction tank 12, an inlet 14 located at the bottom of tank 12 and an outlet 16 at the top of tank 12. Wastewater from a feed 18 enters reaction tank 12 at inlet 14 and flows upwardly through tank 12 toward outlet 16. Feed 18 may comprise untreated wastewater or a combination of untreated wastewater and reagents. Wastewater exits tank 12 at outlet 16 to a connected effluent piping system (not shown). The tapered shape of tank 12 results in a gradient of wastewater flow velocity that decreases from inlet 14 to outlet 16.

Solutes in wastewater precipitate into solid particles 22 (e.g., struvite or other phosphorous-containing compounds) in tank 12. The upward flow of wastewater counteracts the force of gravity on particles 22. Solid particles 22 are fluidized where the velocity of wastewater in tank 12 is sufficiently great that the force of the wastewater on particles 22 balances or exceeds the force of gravity. Because the force of wastewater on particles 22 tracks the gradient of wastewater velocity, particles 22 of different sizes will be sorted by size at different elevations in tank 12 where the forces of gravity and wastewater flow are in equilibrium. Smaller particles tend to be found near the top of tank 12 while larger particles tend to be found closer to the bottom of tank 12.

As particles 22 grow (e.g., due to agglomeration and/or crystal growth), they tend to move downward in tank 10. In some embodiments, upflow of wastewater in reactor 12 supports pellets of struvite or other phosphorus-containing compounds which form in the reactor through precipitation of dissolved materials. As the pellets grow larger over time, they may become sorted according to size by differences in wastewater velocities rates in different regions within the reactor.

It is typical to allow pellets to grow to at least a minimum size before they are harvested (e.g., in some applications it is desirable to harvest struvite in pellets having a diameter of 1 mm or more). Pellets of a harvestable size may tend to accumulate in a harvesting zone from which they may be removed. Reactor 10 comprises an optional elutriation leg 26 that may be useful for harvesting pellets from a harvesting zone. Elutriation leg 26 is in fluid communication with reaction tank 12 and an elutriation fluid source (not shown). Elutriation fluid flows upwardly from the bottom of leg 26. Simultaneously, precipitate particles are gravitationally fed to the top of leg 26 and travel downwardly through leg 26 in countercurrent to elutriation fluid flow. The upward flow of elutriation fluid fluidizes the downward flow of precipitate particles. Elutriation fluid may be water from a municipal supply, for example. In some embodiments, precipitate particles in an elutriation leg are fluidized by wastewater from feed 18. Elutriation leg 26 may comprise a valve operable to break fluid communication along elutriation leg 26. Fluid flow in elutriation leg 26 may be adjusted using a flow control device (e.g. a rotameter, flow control valve, pump, etc.) to selectively reject particles below a desired minimum size and return them to the reactor to allow them to grow further before harvesting. In this way only particles larger than the desired size are removed from the reactor by way of elutriation leg 26. Smaller particles are left to grow until they reach the desired size. The fluid flowing in elutriation leg 26 may be supplied from a separate water source (e.g. process water, potable water, etc.) or may be drawn from the reactor recycle or effluent flow.

In order to avoid accumulation of scale in the connected effluent piping system and ensure a high precipitation yield it is desirable that wastewater exiting tank 12 contain a low concentration of certain solutes and that few precipitate particles 22 are lost by being carried from tank 12 into the effluent piping system. The concentration of solutes in wastewater exiting tank 12 may be reduced by lengthening the residence time that wastewater spends in tank 12 to provide greater opportunity for precipitation to occur. This may be achieved, for example, by increasing the volume of tank 12 relative to the flow rate at inlet 14. The presence of precipitate particles 22 in wastewater in the vicinity of outlet 16 may be reduced by enlarging the cross-section of tank 12 at its top end (i.e., in a clarifying section) so that fluid velocity at the top end of tank 12 is sufficiently low that all but very small precipitate particles 22 settle before entering the vicinity of outlet 16.

Figure 2:
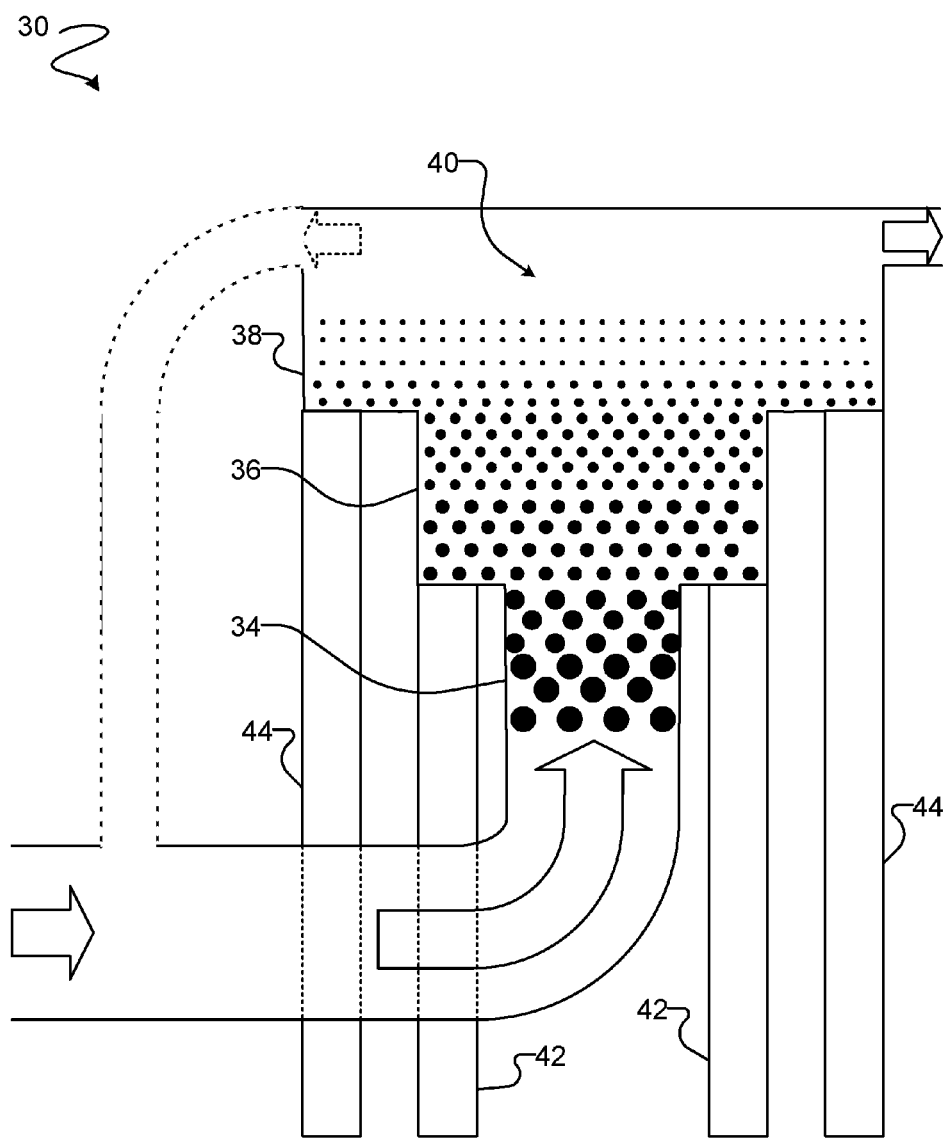
FIG. 2 is a side elevation cross-section view of a stepwise-tapered fluidized-bed reactor according to an example embodiment.

FIG. 2 is a diagram schematically illustrating a fluidized-bed reactor 30 according to an example embodiment. Reactor 30 comprises a step-wise tapered reaction tank 32 having an enlarged clarifying section, namely upper section 38, as well as a lower section 34, and a middle section 36. The cross-sectional area of upper section 38 is larger than the cross-sectional area of middle section 36, which in turn is larger than the cross-sectional area of lower section 34. Reactor 30 may be operated so that the ratio of the inlet flow rate relative to the cross-sectional area of the upper section 38 of tank 32 is sufficiently small that a quiescent zone 40 exists in the upper section 40 of the tank. In quiescent zone 40, fluid velocity is sufficiently low that precipitate particles tend to settle out of quiescent zone 40.

Clarifying sections of large cross-sectional area are associated with several costs. A larger cross-section corresponds to a greater mass of wastewater in the clarifying section. To provide a general notion of the mass involved, consider that a cylindrical section of water measuring 5 meters in diameter by 1.5 meters in height will have a mass of approximately 29.4 metric tonnes. Where a large clarifying section is elevated to provide counter-gravity flow of wastewater, robust structural supports may be required to support the mass of wastewater contained in the clarifying section. In reactor 30, the weight of wastewater in upper section 38 is supported by structural supports 42 and 44. Larger tanks also have greater construction costs and larger installation footprints. Larger tanks may introduce practical difficulties in manufacturing and in transporting tanks to the locations where they will be installed.

Reactor 10 has an optional recycling path 24 by which wastewater is fed back into the reactor upstream of inlet 14. Recycling path 24 causes at least some wastewater to circulate through the tank more than once before exiting to the effluent piping system, thereby providing greater opportunity for particle formation (e.g., by nucleation) and growth (e.g., by agglomeration and/or crystal growth). Recycling path 24 also increases the rate of fluid flow, and, correspondingly fluid velocity, in tank 12 between the return of recycling path 24 and the top of tank 12.

Because recycling path 24 increases fluid velocity in tank 12, it results in increased fluid velocity in the region of outlet 16. This increases the size and number of precipitate particles that may be supported by the fluid flow in the vicinity of outlet 16, and in turn can lead to greater numbers of precipitate particles entrained from tank 12 through outlet 16. Though the increase in precipitate particles exiting tank 12 due to the effect of recycling path 24 may be offset by increasing the cross-sectional area of tank 12 relative to the inlet flow rate to allow more settling (e.g., as shown in FIG. 2), this decreases the efficiency of recycling since it results in fewer particles being recycled to undergo agglomeration and crystal growth (e.g., because particles may tend to settle away from the intake of recycling path 24), and has the drawbacks of a larger tank.

The effect of recycling flow rate on entrainment of precipitate particles via outlet 16 of reactor 10 may also be in tension with the use of reactor 10 to obtain high recovery of struvite from wastewater feed 18 having high concentrations of phosphorous. In some applications, wastewater feed 18 may have phosphorous concentrations in excess of 60 mg/L as PO—P, and as high as 10,000 mg/L as $PO_4$—P. In order to obtain a high recovery of phosphate (e.g., over 70% or over 90%) as large struvite pellets (e.g. 0.5 mm to 5 mm diameter) a relatively low supersaturation ratio should be maintained in tank 12 (e.g., a supersaturation ratio below 5). To maintain such low supersaturation ratios in the presence of highly concentrated feed, recycle-to-feed ratios of least 3 to 1 to 100 to 1 or more may be desirable.

Figure 3:
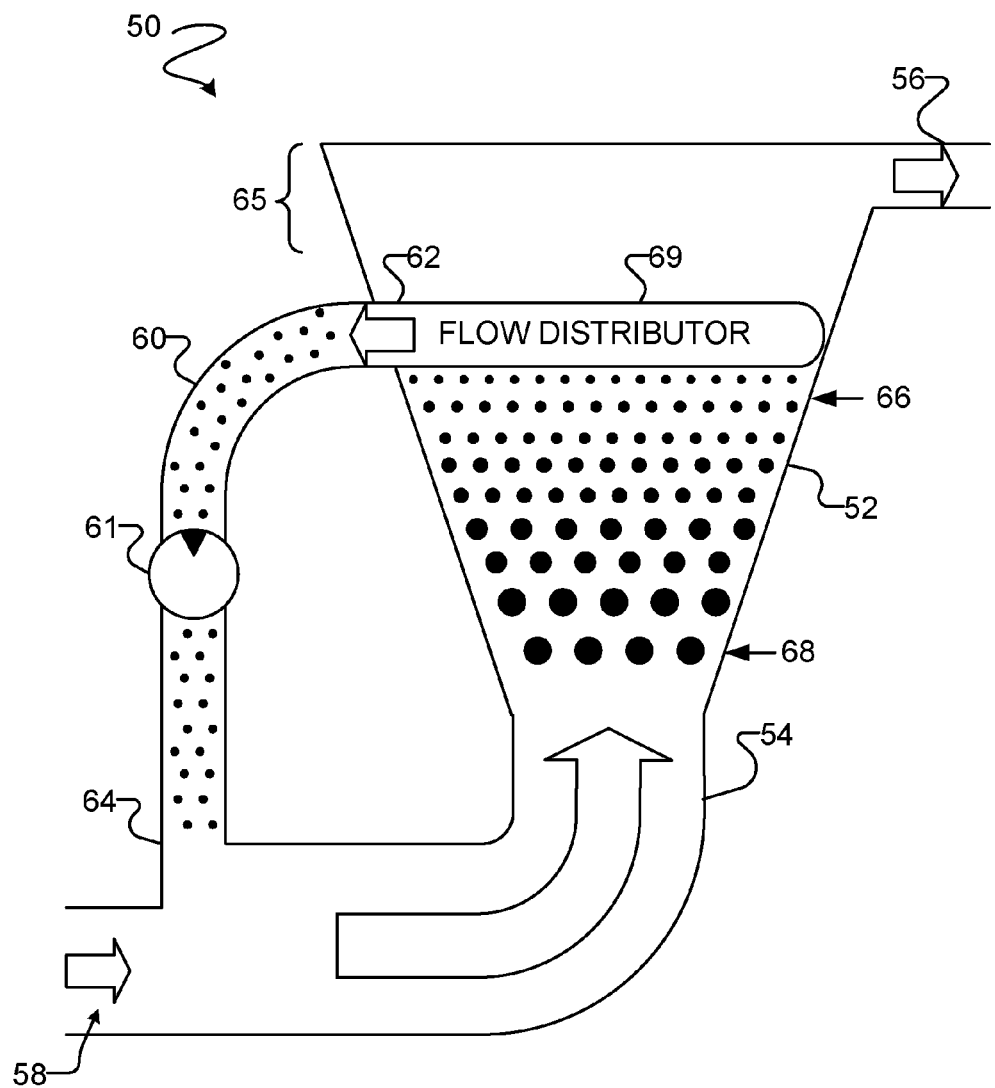
FIG. 3 is a side elevation cross-section view of a tapered fluidized-bed reactor according to an example embodiment.

FIG. 3 is a diagram schematically illustrating a tapered fluidized-bed reactor 50 according to an example embodiment. Reactor 50 comprises a tapered reaction tank 52, an inlet 54 and an outlet 56. Inlet 54 may be located, for example, in or near the lower portion of reaction tank 52. In some embodiments, inlet 54 is located at the bottom of reaction tank 52. In some embodiments, inlet 54 is in the bottom half of reaction tank 52. In some embodiments, inlet 54 is in the bottom third of reaction tank 52. In some embodiments, inlet 54 is in the bottom quarter of reaction tank 52. Outlet 56 may be located, for example, in or near the upper portion of reaction tank 52. In some embodiments, outlet 56 is located at the top of reaction tank 52. In some embodiments, outlet 56 is in the top quarter of reaction tank 52. Some embodiments comprise a plurality of inlets and/or outlets.

Wastewater from a feed 58 enters reaction tank 52 at inlet 54 and exits tank 52 at outlet 56. In the illustrated embodiment, inlet 54 is directed upwardly and flow of fluid introduced from inlet 54 into reactor tank 52 is directed upwardly. Inlet 54 and/or outlet 56 may be oriented substantially vertical, substantially horizontal, or at an angle to reactor tank 52.

Reactor 50 comprises a recycling path 60. Wastewater enters recycling path 60 at an intake 62 located downstream of inlet 54 and upstream of outlet 56. Recycling path 60 returns at least part of the removed wastewater to tank 52 upstream of intake 62 at a return 64. In the illustrated embodiment, intake 62 is located above inlet 54 and below outlet 56. Because recycling path 60 draws fluid upstream of outlet 56, the fluid velocity in tank 52 downstream of (e.g., above) intake 62 does not depend to a significant degree on the flow rate of recycling path 60. Accordingly, the flow rate of recycling path 60 may be increased without correspondingly increasing the fluid velocity in the vicinity of outlet 56. As a result, reactor 50 may be operated with a high recycling ratio yet have a relatively small volume quiescent zone 65 (e.g., in terms of cross-sectional area and/or volume) between intake 62 and outlet 56.

In the illustrated embodiment, recycling path 60 comprises a flow control unit 61. Flow control unit 61 may comprise a throttling element, such as a valve or the like. Flow control unit 61 may comprise a pump or the like. Elbow pumps, propeller pumps and draft tubes are types of pumps that tend to be good for high-flow, low-head applications. Such pumps may be incorporated in flow control unit 61. However pumps of other suitable types may also be used in this application. Advantageously, pumps incorporated in flow control unit 61 are of types that provide relatively low turbulence since such pumps are less likely than pumps of types which cause more turbulence to form struvite scale deposits when treating wastewaters saturated with $CO_2$. Low turbulence pumping devices are also less likely to cause mechanical damage or attrition to fine struvite particles being recycled through the recycle path, thus encouraging the formation of larger particles in the reactor.

Flow control unit 61 may be connected to a fluid supply and introduce fluid to recycle path 60, such as a wash fluid (e.g., non-potable water, mineral or organic acid), for example.

In some embodiments, the flow rate of recycling path 60 is at least three times the flow rate of feed 58. The ratio of the flow rate of recycling path 60 to the flow rate of feed 58 may be 100:1 or more in some embodiments. In embodiments for high strength wastewater applications (e.g. 10,000 mg/L P) high recycle ratios may be useful. Such recycle ratios may be 300:1 or more.

In some embodiments, the cross-sectional area of the quiescent zone above intake 62 may be reduced by a factor of 3 or more, as compared with a similarly dimensioned reactor in which a recycle path draws water from the top of its reactor tank.

Flow control unit 61 or other features of recycle path 60 may break larger precipitate particles into smaller precipitate particles. The efficiency of reactor 50 in developing large struvite pellets may be impaired if larger precipitate particles are drawn into recycling path 60 and broken into smaller precipitate particles. Reactor tank 52 tapers from a first cross-section 66 below intake 62 to a smaller second cross-section 68 upstream of and below first cross-section 66. The taper of tank 52 from first cross-section 66 to second cross-section 68 results in a gradient of wastewater velocity, and a corresponding gradient distribution of precipitate particles according to size. Because intake 62 is located above first cross section 66, reactor 50 may be operated so that wastewater entering recycling path 60 will contain relatively fine precipitate particles, if any, rather than relatively large particles. Recycling of relatively fine precipitate particles may encourage more uniform crystal growth.

In reactor 50, return 64 of recycling path 60 is located upstream of inlet 54. Recycled wastewater may be introduced at inlet 54 or downstream of inlet 54 at the base of reactor 52 through an external recycling conduit, or through a draft tube for example. Reintroduction of fine precipitate particles upstream of and/or near the inlet of reactor 52 permits the recycled wastewater to mix with fresh feed and reagents, which may encourage rapid growth of any fine precipitate particles that are in the recycled wastewater.

Reactor 50 comprises an optional flow distributor 69. Flow distributor 69 is configured to collect wastewater from tank 52 and deliver it to intake 62. Flow distributor 69 may comprise one or more ports (not shown) at which wastewater from tank 52 can be drawn by flow distributor 69. Ports of flow distributor 69 may be arranged to draw wastewater from different locations in reactor tank 52. In some embodiments, ports of flow distributor 69 are arranged to draw wastewater from different locations of a cross-section of tank 52. For example, flow distributor 69 may comprise an array of ports arranged to draw wastewater from a plurality of different locations distributed across a cross-section of tank 52. In some embodiments, ports of flow distributor 69 are arranged such that flow distributor 69 may draw water substantially uniformly from a cross-section of tank 52.

Uniform drawing of recycle wastewater may aid in maintaining a uniform distribution of flow in the fluidized bed below intake 62 and may avoid short circuiting wastewater flow from inlet 54 to recycling path 60. Flow distributor 69 may comprise, for example, a flow-distribution manifold, a submerged weir, or the like.

In the illustrated embodiment, flow distributor 69 is substantially planar, and ports of flow distributor 69 may be arranged to draw wastewater from across a corresponding planar cross-section of tank 52. In some embodiments, a reactor comprises a non-planar flow distributor (e.g., a flow distributor in the shape of a cone, or the like) and ports of the flow distributor may be arranged to draw wastewater from across a corresponding non-planar surface in tank 52.

In many cases the head loss resulting from flow through the flow distributor will be sufficient to cause some dissolved gasses to be removed from solution in the flow distributor. For example, in cases where the wastewater being treated is saturated with $CO_2$ or carbonic acid, $CO_2$ offgassing (with resultant pH increases) may occur in the flow distributor. This can encourage struvite precipitation in the flow distributor (e.g. precipitation on manifolds, orifices, pump impellers and/or piping. For this reason it is advantageous for surfaces of the flow distributor to be coated with a scale resistant coating such as Teflon™, Kynar™ (PVDF), Hylar™, or glass lining. Struvite does not adhere well to such coatings. As a result, struvite that precipitates in the flow distributor will become entrained in the flow as fine particulate matter rather than forming heavy masses on walls of manifolds or plugging orifices of manifolds or the like. Scale formation in the flow distributor or recycle line is a maintenance burden both because scale formation can plug pipes to the point that flow is impeded and also because if scale is allowed to build up then pieces of hard scale that are large enough to damage pumping equipment downstream may break off.

Some embodiments comprise a plurality of flow distributors. Flow distributors of some such embodiments may be configured so that wastewater is drawn from different regions having approximately the same fluid flow velocity. For instance, in some embodiments, wastewater velocity near the center of a tank is greater than wastewater velocity near the wall of the tank. An upwardly-opening tapered reactor may comprise a first flow distributor configured to cause wastewater to be drawn from a central region and a second flow distributor located below the first flow distributor configured to cause wastewater to be drawn from a peripheral region concentric with and radially outward of the central region. Multiple flow distributors may be configured to direct wastewater to the same or different intakes of one or more recycle path(s).

In some embodiments, the recycle ratio (e.g., ratio of flow through recycling path 60 to the flow at outlet 56) may be monitored and/or controlled. Some embodiments comprise a control system, such as a process controller, configured to control the recycle ratio, such as by adjusting a gate at intake 62, a gate at return 64, a gate in flow distributor 69, and/or a pump configured to draw fluid through recycling path 60. For example, some embodiments comprise a control system having features described in U.S. Pat. No. 7,622,047 to Koch et al., entitled Fluidized bed wastewater treatment, which is hereby incorporated herein by reference.

In some embodiments, reactor tank 52 is stepwise-tapered; that is, it comprises a plurality of adjacent sections having different cross-sections. For example, tank 52 may comprise a substantially vertically-oriented conduit having a harvesting section and one or more sections above the harvesting section. The number of sections in the conduit may be varied. In some cases there are two or more vertically-sequential sections above the harvesting zone. Sections of the conduit may be cylindrical, for example.

In some embodiments, a cross-section of tank 52 above intake 62 is the same as a cross-section at and/or immediately below intake 62. In some embodiments, a cross-section of tank 52 above intake 62 is smaller than a cross-section at intake 52.

In some embodiments, the volume of reactor tank 52 and the volume of fluid introduced at intake 62 is such that the mean residence time of wastewater in tank 52 downstream of (above) intake 62 is at least a few minutes. In some embodiments the mean residence time is in the range of 3 to 100 minutes. For example, in some embodiments the feed rate and recycle rate are such that fluid retention time in reactor tank 52 upstream of the recycle manifold is less than 10 minutes. For example about 3-7 minutes in some embodiments.

The height of the reactor may be selected such that the reactor volume is large enough to allow pellets to grow to a desired size. In prototype embodiments, pellets of struvite have been found to grow in diameter at a rate of about 0.1-0.3 mm per day. At these growth rates, to allow pellets to grow to a size of 3 mm diameter would require a pellet residence time in reactor tank 52 of about 10-30 days. For example pellets of sizes in the range of 0.5 to 4.0 mm may be grown in 5-15 days in some embodiments.

Figure 4:
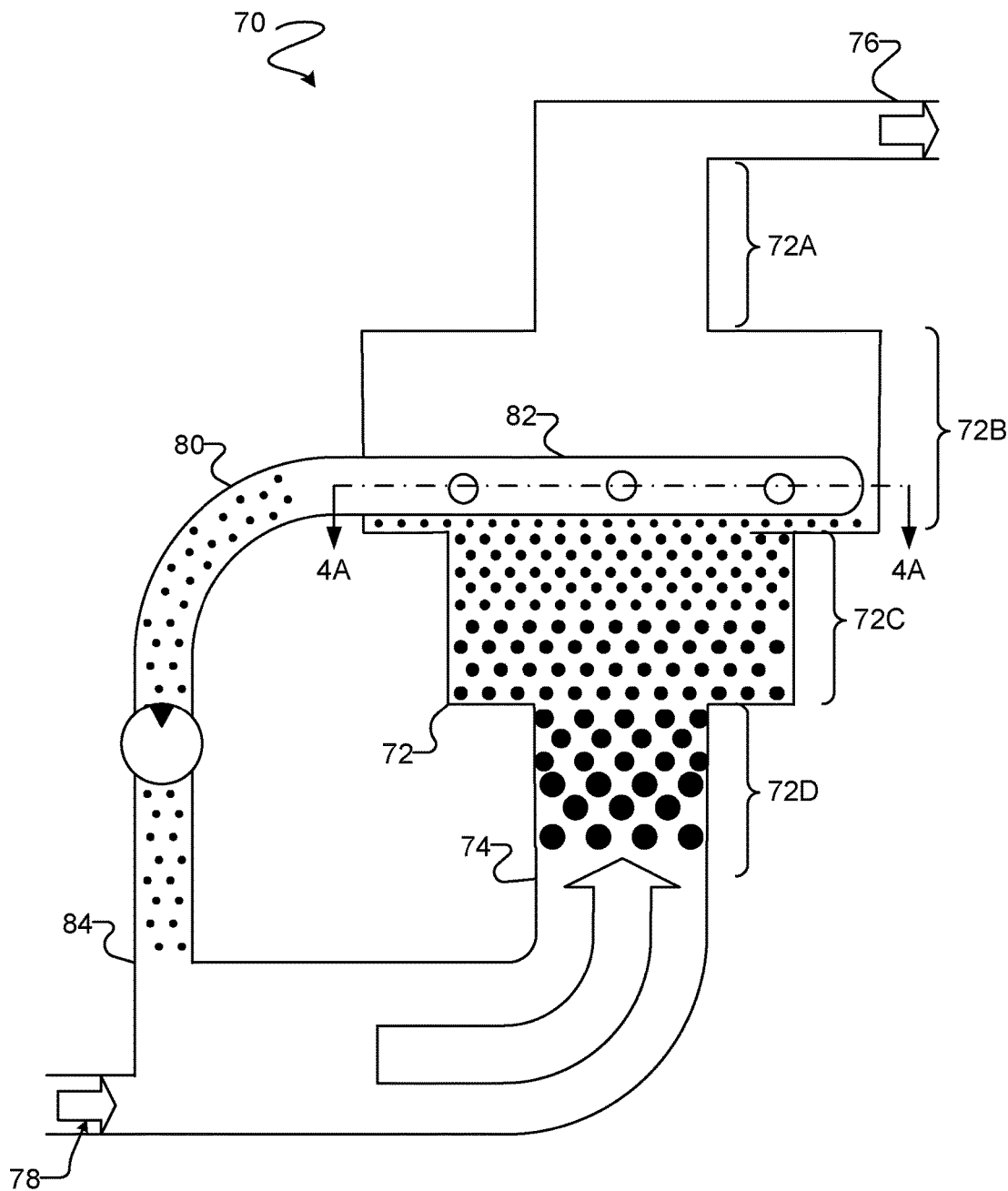
FIG. 4 is a side elevation cross-section view of a stepwise-tapered fluidized-bed reactor according to an example embodiment.

FIG. 4 is a diagram schematically illustrating a tapered fluidized-bed reactor 70 according to an example embodiment. Reactor 70 comprises a stepwise-tapered reactor tank 72, an inlet 74 and an outlet 76. The stepwise taper of tank 72 defines four sections: a clarifying section 72A, a settling section 72B, a reaction section 72C and a harvest section 72D. It is to be appreciated that the names assigned to sections 72A-72D are for illustrative purposes only, and are not to be interpreted as limiting the functionality of any section to a functionality indicated or suggested by its name or as excluding from the functionality of any section a functionality indicated or suggested by the name of any other section. The cross-section of clarifying section 72A is smaller than the cross-section of settling section 72B. The cross-section of settling section 72B is larger than the cross-section of reaction section 72C. The cross-section of settling section 72C is larger than the cross-section of harvest section 72D. It will be appreciated that a stepwise-tapered tank may include a greater or fewer number of sections. Inlet 74 is located at the base of harvest section 72D. Outlet 76 is located at the top of clarifying section 72A.

Stepwise tapering of reactor tank 72 may result in precipitate particles being sorted among the different sections according to size. In the illustrated embodiment, walls of the sections of tank 72 are vertical and are joined by horizontal shelves. In some embodiments, the walls of the sections of a tank are joined by angled shelves. Angled shelves may encourage the downward movement of precipitate particles from higher tank sections to lower tank sections.

Figure 4A:
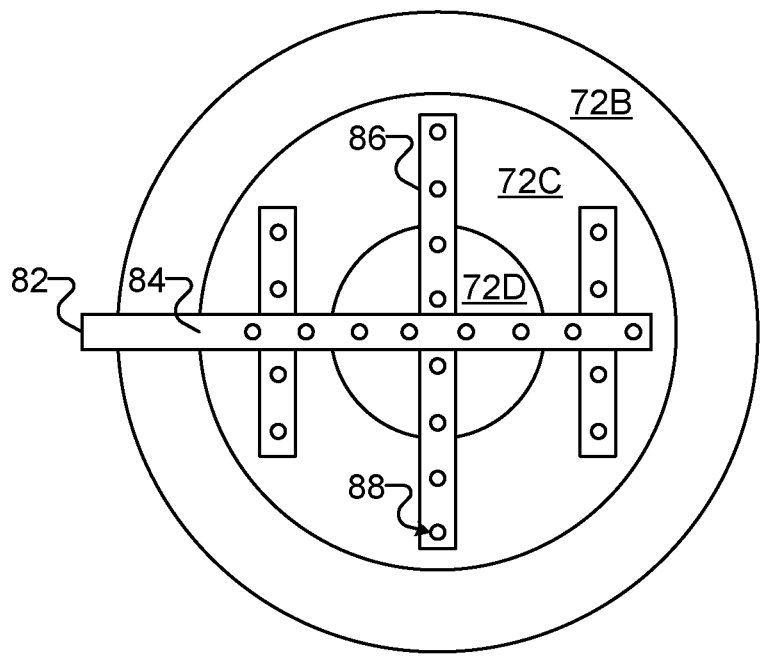
FIG. 4A is a top plan cross-section view of a manifold of the reactor shown in FIG. 4.

Reactor 70 comprises a recycling path 80 that extends from an intake manifold 82 located at the base of settling section 72B to a return 84 upstream of inlet 74. As shown in FIG. 4A, manifold 82 comprises a manifold header 84 and a plurality of manifold arms 86 extending outward therefrom. Manifold header 84 and manifold arms 86 comprise ports, for example orifices 88, through which wastewater is drawn into recycling path 80. The arrangement of orifices 88 of manifold 82 may be such that manifold 82 may draw wastewater substantially uniformly from a cross-section of tank 72. In some embodiments, orifices 88 are pointed upwards. This facilitates cleaning the orifices from the top of the reactor with a pressure washer or long brush, for example. The manifold may extend to or through the vessel wall. The manifold may have access ports (not shown) at one or both ends to allow cleaning of the interior of the manifold from the exterior of the vessel.

By drawing off the recycle wastewater at the base settling zone 72B, the fluid velocity in the upper part of settling section 72B and clarifying section 72A are substantially decoupled from the flow rate at inlet 74, and primarily a function of the rate of feed 78 and the cross-sectional areas of sections 72A and 72B. By lowering the ratio of flow rate into clarifying section 72A relative to the flow rate of recycling path 80, the fluid velocity in clarifying section 72A may be controlled independently of the cross-section of clarifying section 72A. With a sufficiently low ratio, the fluid velocity in a relatively small clarifying section 72A can be reduced to the point that arbitrarily small precipitate particles are not supported against the force of gravity and the mean residence time of wastewater in clarifying section 72A may be made arbitrarily long. As a result, acceptable levels of solute precipitation may be achieved with a relatively small clarifying section 72A (e.g., in terms of cross-sectional area and/or volume), which, as compared with a larger clarifying section 72A, has advantages of reduced construction cost (e.g., a smaller clarifying section will contain a smaller mass of wastewater, and accordingly can be supported with a less robust elevating support structure), reduced installation footprint, and reduced transportation costs (e.g., less difficulty in transporting a reactor tank fabricated off-site).

In some embodiments, manifold 82, or another type of flow distributor, is located at the top of reaction section 72C. In some embodiments, manifold 82, or another type of flow distributor, is located to straddle a boundary between settling section 72B and reaction section 72C. In embodiments, where a flow distributor is located to straddle a boundary between adjacent sections having different cross sections, the flow rate will be different as between the adjacent sections. Manifold 82 may be located in clarifying section 72A or to straddle the boundary between clarifying section 72A and settling section 72B.

In some embodiments, manifold 82 is located at the interface between a lower (upstream) section having a first cross-section and a higher (downstream) section having a second cross-section smaller than the first cross section. In some such embodiments, the intake rate of the manifold greater than a threshold $F_R$, where $F_R$ is given by $$F_R = F_L \left(1 - \frac{\sigma_H}{\sigma_L}\right)$$

where $F_L$ is the flow rate of wastewater in the lower section, $\sigma_L$ is the area of the first cross-section (of the lower section) and $\sigma_H$ is the area of the second cross-section (of the higher section). It will be appreciated that in such embodiments, the effect of decreasing conduit cross-section between the lower and higher sections on flow velocity is at least offset by the effect of reducing the flow rate in the higher section.

Figure 5:
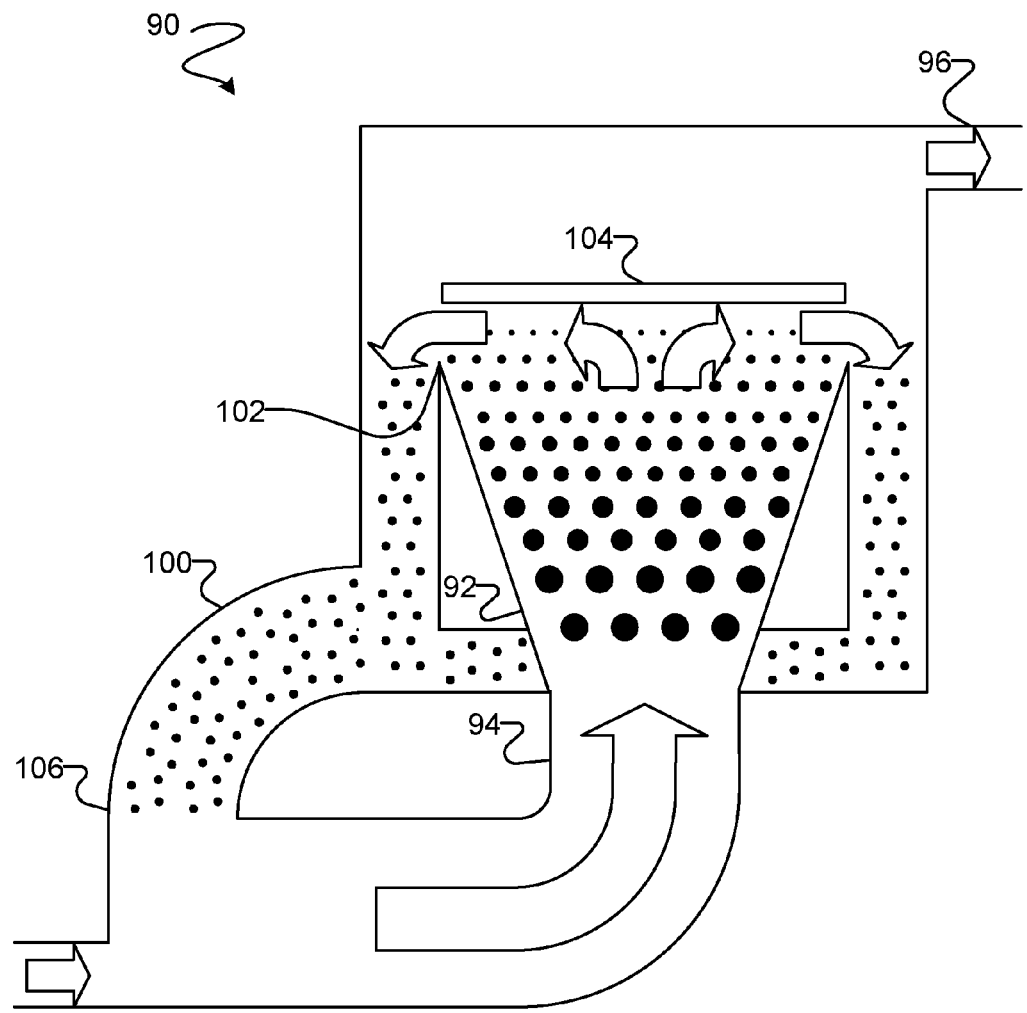
FIG. 5 is a side elevation cross-section view of a tapered fluidized-bed reactor according to an example embodiment.

FIG. 5 is a diagram schematically illustrating a tapered fluidized-bed reactor 90 according to an example embodiment. Reactor 90 comprises a tapered reactor tank 92, an inlet 94 and an outlet 96. Reactor 90 comprises a recycling path 100 that extends from a submerged intake weir 102 located below an optional flow distribution plate 104 to a return 106 upstream of inlet 94. Flow distribution plate 104 causes upwardly flowing fluid to be at least partially deflected peripherally (e.g., radially outwardly) towards weir 102, the crest of which defines a port. Flow distribution plate 104 may be perforated (e.g., flow distribution plate 104 may comprise a screen). In some embodiments, the downward face of the flow distribution plate is downwardly sloped (e.g., downward conical, downward pyramidal, etc.). In some embodiments, the upward face of the flow distribution plate is upwardly convex (e.g., upward conical, upward pyramidal, etc.).

Figure 6A:
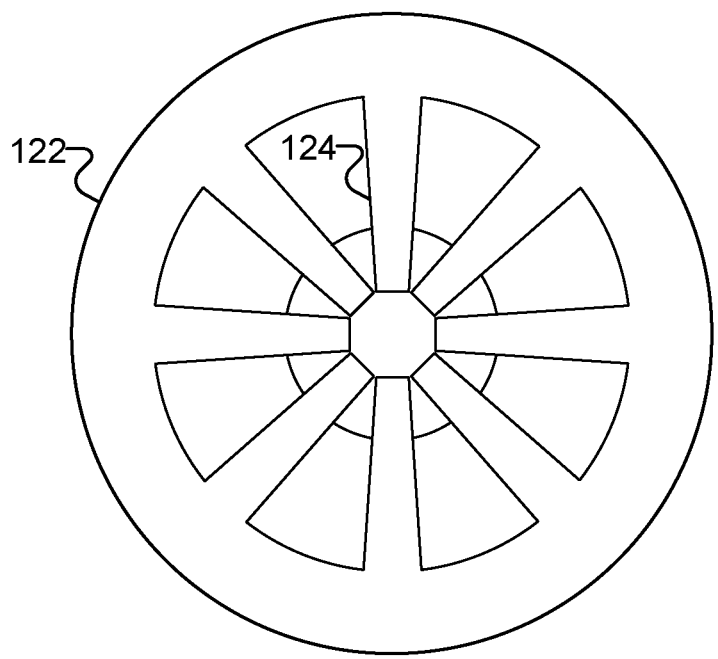
FIG. 6A is a top plan cross-section view of a launder array of the reactor shown in FIG. 6.
Figure 6:
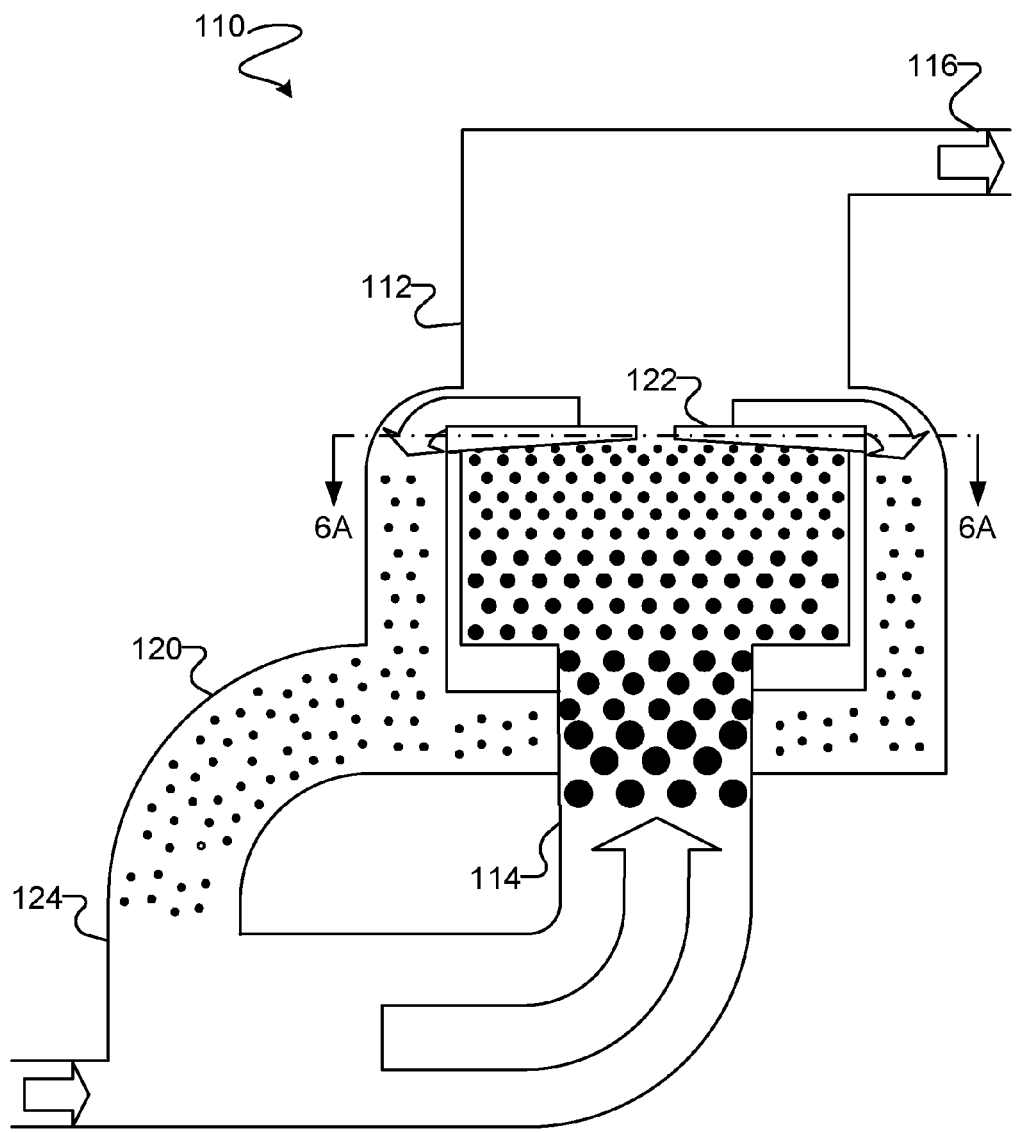
FIG. 6 is a side elevation cross-section view of a tapered fluidized-bed reactor according to an example embodiment.

FIG. 6 is a diagram schematically illustrating a tapered fluidized-bed reactor 110 according to an example embodiment. Reactor 110 comprises a reactor tank 112, an inlet 114 and an outlet 116. Reactor 110 comprises a recycling path 120 that extends from a submerged launder array 122 to a return 126 upstream of inlet 114. As shown in FIG. 6A, launder array 122 comprises a plurality of radially arranged ports, namely launders 124. Launder array 122 draws flowing fluid into recycling path 120 from across a cross-section of tank 112.

By drawing off the recycle wastewater at launder array 122, the fluid flow rate and velocity in the part of reactor tank 112 above launder array 122 are substantially decoupled from the fluid flow rate and velocity in the part of reactor tank 112 below launder array 122. By lowering the ratio of the flow rate above launder array 122 relative to the flow rate below launder array 122 (e.g., by increasing the flow rate of recycling path 120), the fluid velocity in the part of reactor tank 112 above launder array 122 may be controlled independently of the cross-section of that part of reactor tank 112. With a sufficiently low ratio, the fluid velocity in the part of reactor tank 112 above launder array 122 can be reduced to the point that arbitrarily small precipitate particles are not supported against the force of gravity and the mean residence time of wastewater in that part of reactor tank 112 may be made arbitrarily long. As a result, reactor 110 may achieve acceptable levels of solute precipitation with a relatively small reactor tank 112 (e.g., in terms of cross-sectional area and/or volume), which, as compared with a larger reactor tank 112, has advantages of reduced construction cost (e.g., a reactor tank will contain a smaller mass of wastewater, and accordingly can be supported with a less robust elevating support structure), reduced installation footprint, and reduced transportation costs (e.g., less difficulty in transporting a reactor tank fabricated off-site).

Figure 7:
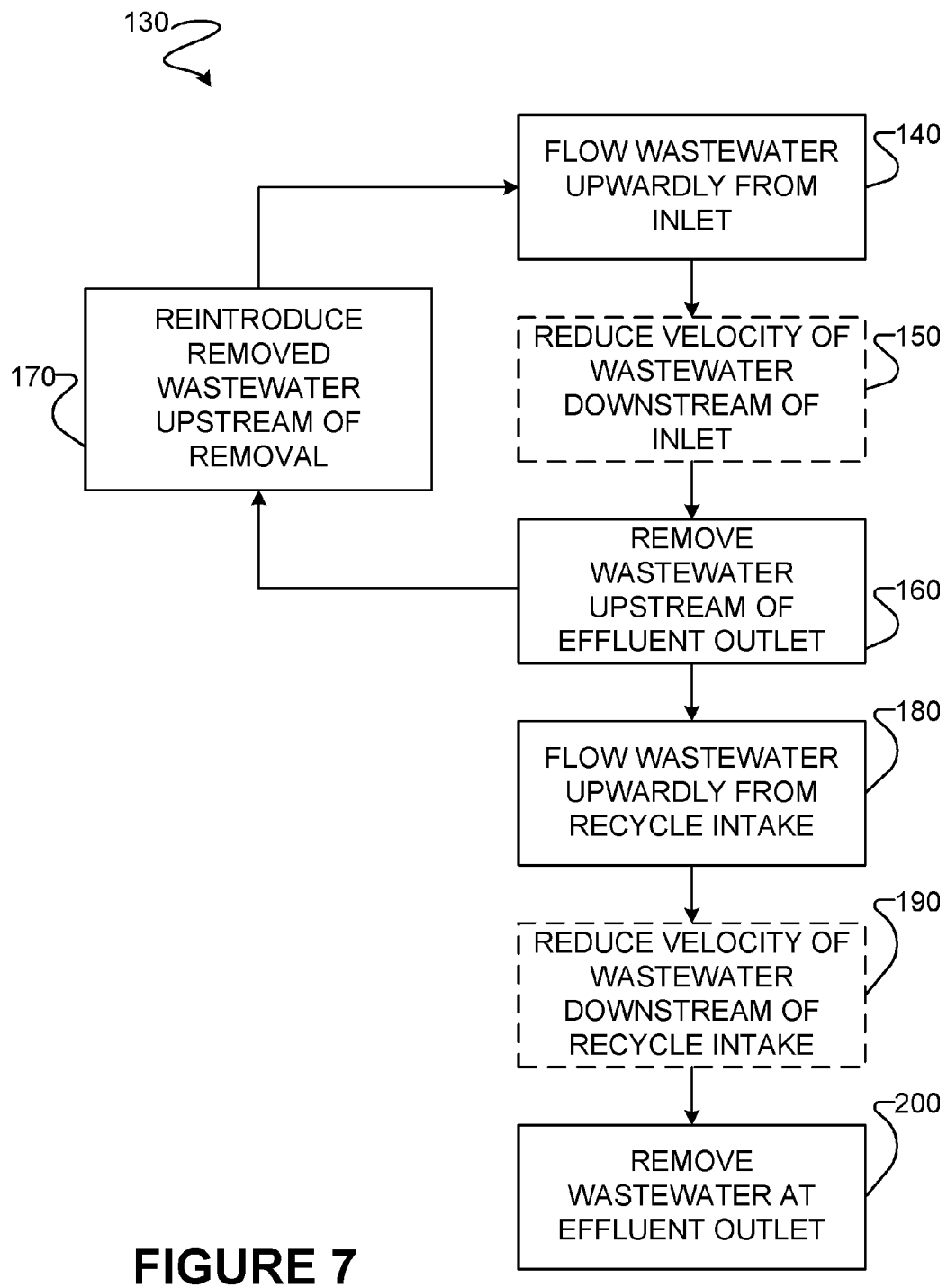
FIG. 7 is a flowchart of a method according to an example embodiment.

FIG. 7 is a flowchart of a method 130 for precipitating solutes from wastewater in a reactor tank according to an example embodiment. In step 140, wastewater is flowed in the reactor tank from an inlet or inlet manifold of the reactor tank. Step 140 may comprise introducing feed wastewater to the reactor tank (e.g., wastewater flowed into the inlet in step 140 may comprise feed wastewater).

In step 160, wastewater is removed from the reactor tank upstream of an effluent outlet of the reactor tank. In some embodiments, step 160 comprises removing wastewater at least a vertical distance of 12 to 30 feet above a feed inlet to the reaction tank. Step 160 may comprise drawing wastewater for removal from a plurality of different locations in the reactor tank. For example, step 160 may comprise removing wastewater with one or more flow distributors having ports arranged to draw wastewater from different locations distributed across a cross-section of the reactor tank. Step 160 may comprise removing wastewater substantially uniformly from a cross-section of the reactor tank. In some embodiments, step 160 comprises drawing wastewater for removal from a plurality of different regions in the reactor tank at which the wastewater flow velocity is substantially the same.

Step 160 may comprise throttling, pumping or otherwise controlling the rate at which wastewater is removed from the reactor tank. In some embodiments, step 160 comprises removing wastewater at a rate proportional to the rate at which feed wastewater is introduced to the reactor tank (e.g., in step 140). In some embodiments, step 160 comprises removing wastewater at a rate that is 3 to 300 times as great as the rate at which feed wastewater is introduced to the reactor tank.

In some embodiments, step 160 comprises removing wastewater at a rate such that the velocity of wastewater immediately upstream of the point at which wastewater is removed for recycling is in the range of about 50 to 200 cm/min. The ratio of the average flow velocity immediately below the point at which wastewater is removed for recycling to the average flow velocity immediately above the point at which wastewater is removed for recycling may be, for example, in the range of about 4 to 300.

In step 170, removed wastewater is reintroduced to the reactor tank upstream of where wastewater was removed in step 160. Step 170 may comprise reintroducing removed wastewater at the inlet of the reactor tank, upstream of the inlet of the reactor tank and/or downstream of the inlet of the reactor tank. In some embodiments, step 170 comprises reintroducing removed wastewater to a plurality of different locations upstream of where recycle wastewater was removed in step 160. Step 170 may comprise mixing the removed wastewater with a wash fluid (e.g., non-potable water, mineral or organic acids), reactants (e.g. sources of Mg such as $Mg(OH)_2$, $MgCl_2$, $MgSO_4$, and the like, ammonia sources such as ammonia gas, anhydrous ammonia, ammonium hydroxide, ammonium sulphate, monoammonium phosphate, diammonium phosphate, ammonium polyphosphate and the like and/or phosphate sources such as trisodium phosphate, phosphoric acid, monoammonium phosphate, ammonium polyphosphate, diammonium phosphate and the like).

Some embodiments comprise optional step 150. In step 150, the velocity of wastewater flowing downstream of the inlet is reduced. Step 140 and step 150 may be combined. In embodiments where method 130 includes step 150, step 160 may comprise removing wastewater having a velocity lower than wastewater at the point where recycle wastewater is reintroduced in step 170. Step 150 may comprise flowing wastewater downstream of the inlet through a section of the reactor tank of increasing cross-section, such as, for example, a continuously tapered or stepwise-tapered conduit. Where particles are formed from precipitated solutes in the wastewater, reducing the velocity of the upwardly flowing wastewater may cause the particles to be distributed along a velocity gradient.

In step 180, wastewater downstream of a point at which wastewater is removed in step 160 (e.g., a recycle intake) is flowed upwardly. In step 200, wastewater is removed at the effluent outlet of the reactor tank. Step 200 may comprise removing wastewater at a rate substantially equal to the rate at which feed wastewater is introduced to the reactor tank in step 140. In some embodiments, step 200 comprises removing wastewater at least a vertical distance of 30 to 150 cm above a point at which wastewater is removed in step 160.

Some embodiments comprise optional step 190. In step 190, the velocity of wastewater flowing downstream of a point at which wastewater is removed for recycling in step 160 (e.g., a recycle intake) is reduced. Step 180 and step 190 may be combined. In embodiments where method 130 includes step 190, step 200 may comprise removing wastewater having a velocity lower than the velocity of wastewater at the point at which wastewater was removed for recycling in step 160. Step 190 may comprise flowing wastewater downstream of the recycle intake through a section of the reactor tank having a cross-section greater than the cross-section of the reactor tank at the recycle intake.

In some embodiments, step 190 comprises reducing the velocity of wastewater so that the velocity of wastewater upstream of a point at which wastewater is removed at the effluent outlet in step 200 (e.g., in a clarifying section of the reactor tank) is small enough to prevent particles larger than a given size from exiting the reaction tank at the effluent outlet.

Figure 8:
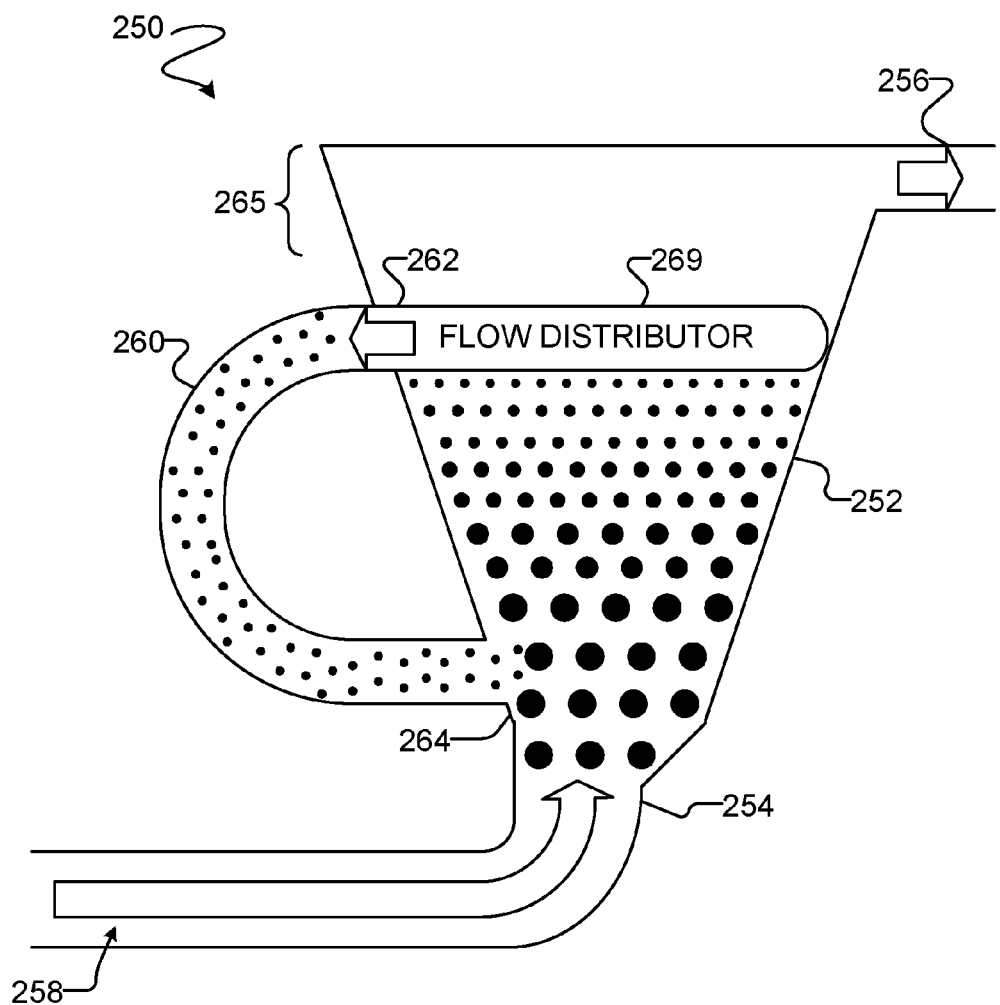
FIG. 8 is a side elevation cross-section view of a tapered fluidized-bed reactor according to an example embodiment.

FIG. 8 is a diagram schematically illustrating a tapered fluidized-bed reactor 250 according to an example embodiment. Reactor 250 of the FIG. 8 embodiment is generally similar to reactor 50 of the FIG. 3 embodiment, and similar reference numerals are used to refer to similar components, except that the reference numerals for components of reactor 250 are preceded by the numeral "2". Reactor 250 differs from reactor 50 in that the recycling path 260 of reactor 250 carries water from intake 262 to reactor tank 252 at a return 264 separate from inlet 254 where feed 258 is introduced to tank 252. In the illustrated embodiment, return 264 is located downstream of inlet 254. In other embodiments, return 264 may be located upstream of and/or below inlet 254. In some embodiments, a recycling path returns recycle wastewater to a reactor tank at a plurality of different locations. In some embodiments, a plurality of recycling paths return recycle wastewater to a reactor tank at a single location. In some embodiments, a plurality of recycling paths return recycle wastewater to a reactor tank at a plurality of different locations.

Figure 9:
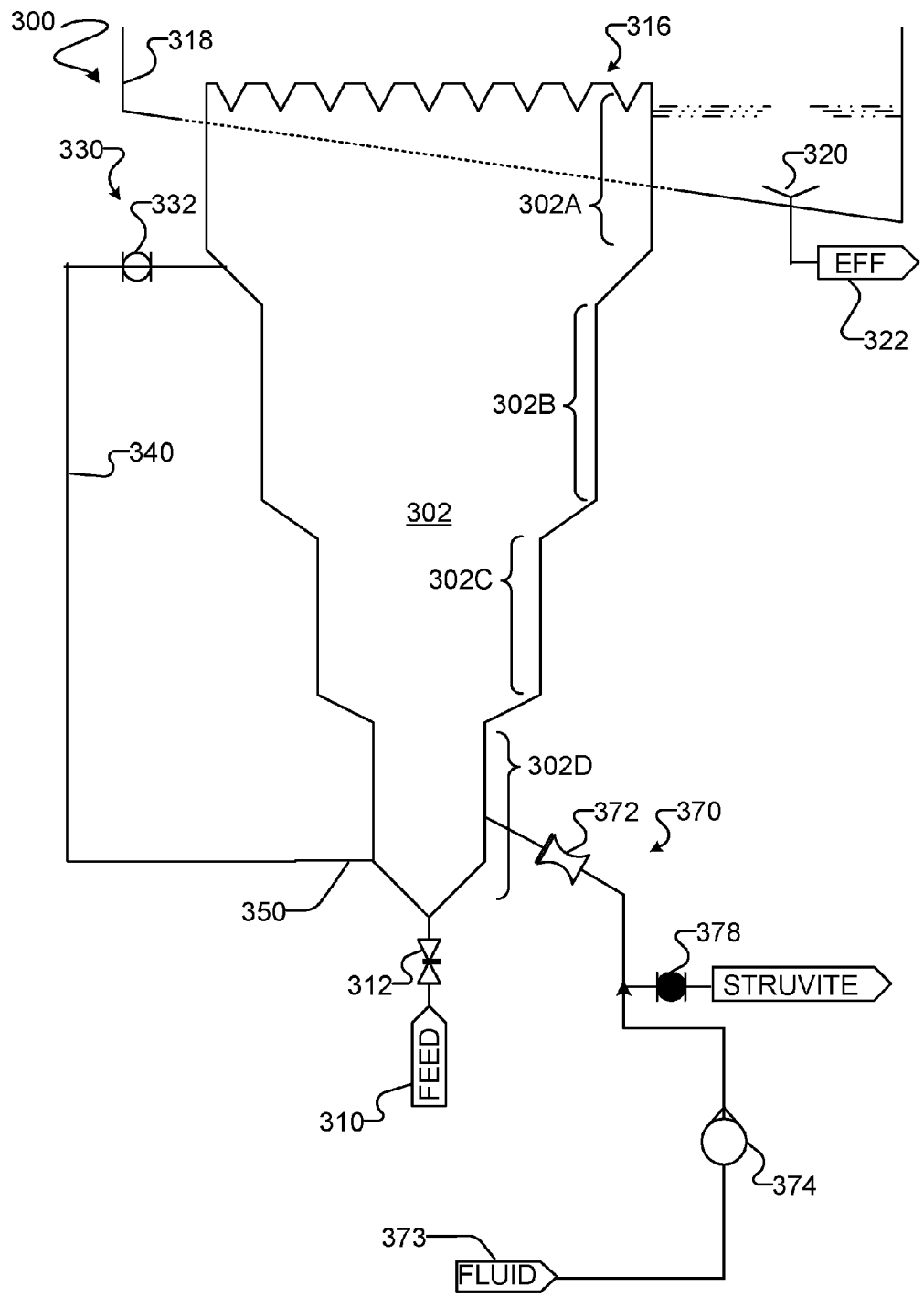
FIG. 9 is a side elevation cross-section view of a stepwise-tapered fluidized-bed reactor according to an example embodiment.

FIG. 9 is a diagram schematically illustrating a tapered fluidized-bed reactor 300 according to an example embodiment. Reactor 300 comprises a stepwise-tapered reactor tank 302. The stepwise taper of tank 302 defines four sections: a clarifying section 302A, a settling section 302B, a reaction section 302C and a harvest section 302D. It is to be appreciated that the names assigned to sections 302A-302D are for illustrative purposes only, and are not to be interpreted as limiting the functionality of any section to a functionality indicated or suggested by its name or as excluding from the functionality of any section a functionality indicated or suggested by the name of any other section. The cross-section of clarifying section 302A is larger than the cross-section of settling section 302B. The cross-section of settling section 302B is larger than the cross-section of reaction section 302C. The cross-section of settling section 302C is larger than the cross-section of harvest section 302D.

Wastewater feed 310 is provided via a control valve 312 to the bottom of harvest section 302D. Wastewater flows upwardly through tank 302 to an adjustable weir 316 located at the top of clarifying section 302A. Water spills over adjustable weir 316 into an effluent launder 318. The floor of effluent launder 318 is below the bottom of weir 316 and sloped to collect effluent at one or several points on the launder connected to effluent piping. Effluent in launder 318 above the level of effluent pipe or funnel 320 is carried out of launder 318 to an effluent outlet 322.

A wastewater recycle intake 330 is located at the interface between the top of settling section 302B and the bottom of clarifying section 302A. Wastewater recycle intake 330 comprises a valve 332 operable to control the flow of wastewater through intake 330. Wastewater recycle intake 330 provides recycle wastewater to a recycle path 340. Recycle path 340 re-introduces recycle wastewater to harvest section 302D at a recycle return 350. A pumping system (not shown) moves wastewater along recycle path 340.

An elutriation leg is connected to harvest section 302D. Fluid from a fluid source 373 is delivered to elutriation leg 302D by a pump 374. Elutriation leg 302D comprises a restrictor valve 372 operable in conjunction with pump 374 to control the fluid velocity in elutriation leg 302D. Precipitate particles that are large enough can enter elutriation leg 302D against the fluid flow. Such precipitate particles (e.g., struvite pellets) from harvest section 302D can pass along elutriation leg 302D to a valve 378. The precipitate particles together with a small amount of wastewater may be discharged via valve 378 for de-watering and product handling, storage or packaging.

Figure 10:
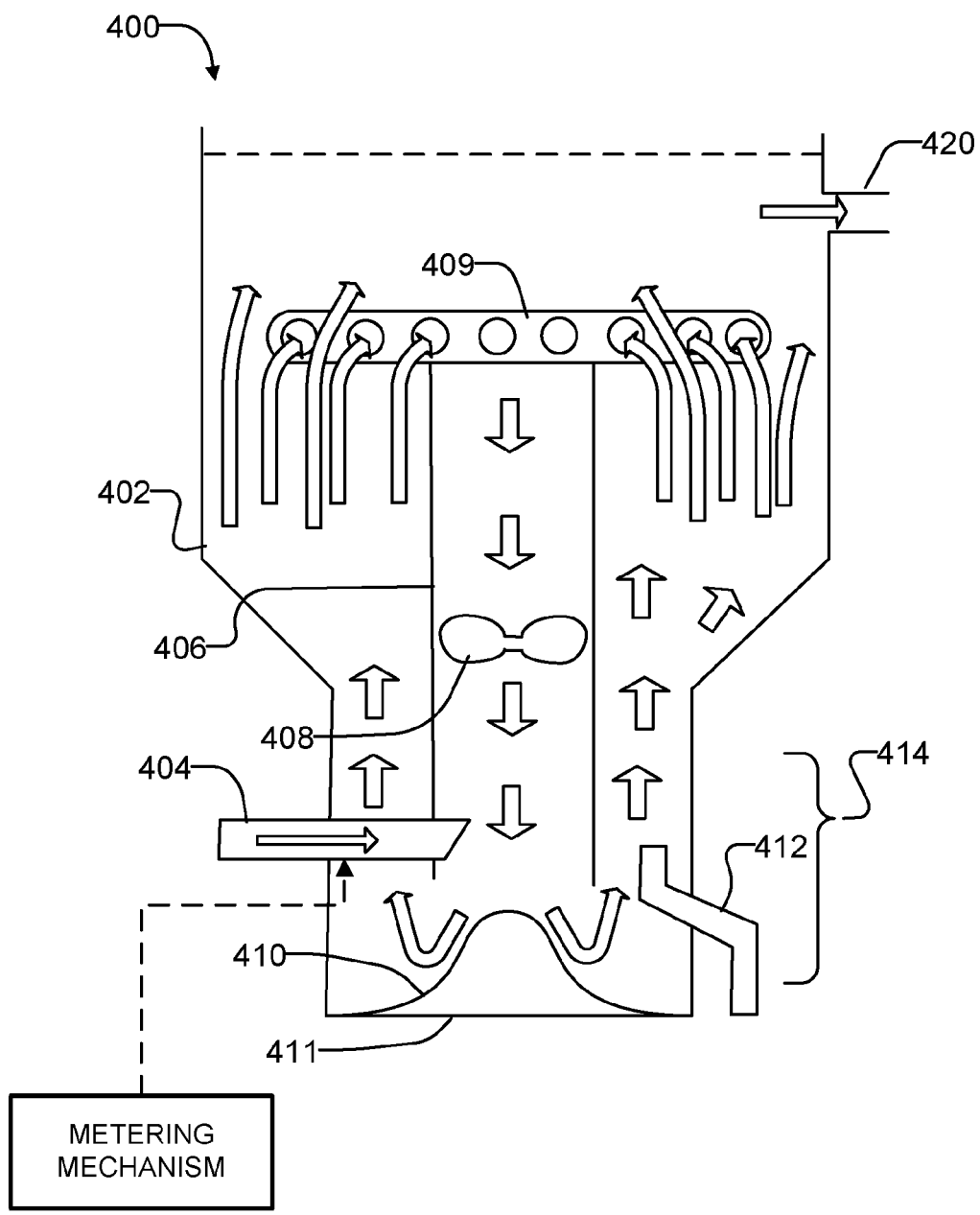
FIG. 10 is a side elevation cross-section view of an example reactor including a draft tube.

It is not mandatory that the recycle path be external to a reactor. In some embodiments, part or all of the recycle path lies within the volume of the reactor. FIG. 10 is a diagram schematically representing a tapered fluidized bed reactor 400 with an internal recycle path extending from a recycle manifold 409 located below the outlet 420, through a draft tube type flow control device 406. In the illustrated embodiment, an impeller or propeller 408 located in draft tube 406 is driven by a suitable motor (not shown) to cause fluid to flow downwardly through draft tube 406. The operation or propeller 408 may be controlled by a controller and/or a variable baffle or valve may be provided in draft tube 406 to provide control over the rate at which fluid is recycled in draft tube 406. The recycled flow is directed to the base of reactor 400. At the base of reactor 400 a substantially conical or curved flow distributor 410 is provided to redirect the recycle flow towards the perimeter of the reactor and upwards. Flow distributor 410 is circularly symmetrical (has the form of a solid of revolution) in some embodiments. In the illustrated embodiment, the base 411 of reactor 400 is substantially flat and supported on grade on a typical (e.g. concrete) foundation, thus significantly reducing or eliminating the need for structural support members, and reducing the overall height of reactor 400 compared to other vessels with equal volume or capacity.

In this embodiment feed wastewater and/or reagents can be introduced through horizontal, vertical or angled pipes, tuyeres or a manifold positioned to discharge the fluids near the base of the draft tube (either in or below the discharge of the draft tube). The inflow passage(s) may be arranged to feed water and reagents to mix with the recycle flow prior to entering the bed of product pellets in a harvest section 414 in the lowermost part of the reactor.

The illustrated embodiment includes a wastewater inlet conduit 404 which introduces incoming wastewater near the bottom of draft tube 406. Also shown is a metering mechanism 407 which is configured to introduce reactants (e.g. sources of Mg such as $Mg(OH)_2$, $MgCl_2$, $MgSO_4$, and the like, ammonia sources such as ammonia gas, anhydrous ammonia, ammonium hydroxide, ammonium sulphate, monoammonium phosphate, diammonium phosphate, ammonium polyphosphate and the like and/or phosphate sources such as trisodium phosphate, phosphoric acid, monoammonium phosphate, ammonium polyphosphate, diammonium phosphate and the like) into the incoming wastewater and/or into draft tube 406. Such a metering mechanism may be provided in any of the embodiments described herein.

A fluidized bed reactor equipped with a draft tube can be use to control the reaction supersaturation by controlling the recycle flow through the draft tube relative to the rate at which wastewater and/or reagents are being introduced to the reactor. Larger particles of struvite, a struvite analog or another phosphorus-containing compound that form in reactor 400 are collected from harvest zone 414. In the illustrated embodiment, the larger particles are collected in an elutriation leg 412.

Apparatus as described herein may be constructed and/or used in conjunction with operating methods designed to reduce the likelihood of scale formation on surfaces in the apparatus. Saturated $CO_2$ solutions tend to increase in pH due to $CO_2$ offgassing in zones of decreased pressure or high turbulence. pH increases can drive crystallization reactions (such as struvite formation) resulting in equipment scaling. In some embodiments surfaces in areas susceptible to scaling are coated with scale-resistant coatings such as Teflon™, Kynar™ (PVDF), Hylar™ or glass. Low pressure zones tend to occur in flow distribution manifolds on the suction side of pumping elements. Turbulent flow or cascades of reactor contents also tend to lead to $CO_2$ stripping in areas such as overflow weirs, gravity drain pipes and the like. In some embodiment scaling in some areas is controlled by adding dilution water to reduce the concentration of reagents below saturation at the elevated pH, and/or by adding an acidic substance to reduce the pH, and/or by adding $CO_2$ to the solution.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification shall refer to this specification as a whole and not to any particular portions of this specification;

"or" in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a tank, mechanism, pump, conduit, assembly, device, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

While a number of exemplary claims and embodiments have been discussed above, those of skill in the art will recognize certain modifications, permutations, additions and sub-combinations thereof. It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A method for precipitating struvite from wastewater, the method comprising:

flowing wastewater from an inlet of a reactor tank upwardly through a first portion of the reactor tank at a first velocity;

flowing wastewater passing the first portion of the reactor tank through a second portion of the reactor tank at a second velocity lower than the first velocity;

allowing struvite to precipitate and crystallize into pellets in the reactor tank;

recycling wastewater at the second velocity from the second portion of the reactor tank by drawing the wastewater from upstream of an outlet of the reactor tank into a flow distributor in the reactor tank, the flow distributor configured to deliver the wastewater to an intake of a recycling path, and reintroducing the recycle wastewater into the reactor tank upstream from the intake;

in a clarifying section between the intake and upstream of the outlet maintaining an upward fluid velocity lower than the second velocity, and allowing precipitate particles that are carried into the clarifying section to settle under the influence of gravity;

removing wastewater that has passed through the clarifying section at the outlet; and removing crystallized struvite pellets from a harvesting zone of the reactor tank;

wherein:

the second velocity is lower than the first velocity due to an expansion of a cross-sectional area of the second portion relative to a cross-sectional area of the first portion; and the wastewater from the inlet, before flowing upwardly through the reactor tank, is mixed with the wastewater from the recycle path.

2. The method of claim 1 wherein wastewater flowed upwardly from the inlet comprises wastewater from a feed.

3. The method of claim 1 wherein reducing the velocity of wastewater flowing downstream of the inlet comprises flowing the wastewater through a conduit of increasing cross-section.

4. The method of claim 3 wherein reducing the velocity of wastewater flowing downstream of the inlet comprises flowing the wastewater through a continuously tapered conduit.

5. The method of claim 3 wherein reducing the velocity of wastewater flowing downstream of the inlet comprises flowing the wastewater through a stepwise-tapered conduit.

6. The method of claim 1 wherein reintroducing the recycle wastewater to the reactor tank upstream of the intake comprises reintroducing the recycle wastewater at the inlet of the reactor tank.

7. The method of claim 1 wherein reintroducing the recycle wastewater to the reactor tank upstream of the intake comprises mixing the recycle wastewater with a feed.

8. The method of claim 1 wherein reintroducing the recycle wastewater to the reactor tank upstream of the intake comprises reintroducing the recycle wastewater downstream of the inlet of the reactor tank.

9. The method of claim 1 wherein the wastewater comprises dissolved phosphorous.

10. The method of claim 1 wherein the wastewater comprises dissolved phosphorous as phosphate.

11. The method of claim 1 wherein recycling the recycle wastewater comprises drawing the recycle wastewater into a draft tube.

12. The method of claim 11 wherein the inlet is located within the draft tube and the method comprises allowing the wastewater to mix with fluid in the draft tube before flowing the wastewater upwardly through the reactor tank.

13. The method of claim 12 comprising mixing the wastewater from the inlet of the reactor tank with a reagent comprising one or more of a source of Mg and a source of ammonium.

14. The method of claim 1 wherein the flow distributor comprises an inlet manifold comprising ports distributed over a cross section of the reactor tank.

15. The method of claim 14 wherein the ports face upwardly and recycling the wastewater comprises drawing the wastewater downwardly into the ports.

16. The method of claim 1 comprising maintaining the velocity of the wastewater in the clarifying section low enough to prevent particles larger than a threshold size from exiting the reactor tank at the outlet.

17. The method of claim 1 comprising controlling the upward velocity in the clarifying section independently of the second velocity by adjusting the flow of recycle wastewater.

18. The method of claim 1 wherein the intake is located at an interface between upper and lower sections of the reactor tank having different cross sectional areas and the method comprises setting the flow of recycle wastewater to a value greater than $F_R$ given by:

$$F_R = F_L(1 - \sigma_L/\sigma_L)$$

where: $F_L$ is the flow rate of wastewater in the lower section, $\sigma_L$ is a cross sectional area of the lower section of the reactor tank and $\sigma_H$ is the cross sectional area of the upper section of the reactor tank.

19. The method of claim 1 comprising controlling the flow of recycle wastewater to be proportional to a rate at which feed wastewater is introduced into the reactor tank.

20. The method of claim 19 wherein the flow of recycle wastewater is in the range of 3 to 300 times greater than the rate at which feed wastewater is introduced into the reactor tank.

21. The method of claim 1 wherein the upward velocity of the wastewater in the clarifying section is in the range of 50 to 200 cm/min.

22. The method of claim 1 wherein a mean residence time of the wastewater in the clarifying section is in the range of 3 to 100 minutes.

23. The method of claim 1 wherein the first and second velocities are sufficient to support the pellets as a fluidized bed.

* * * * *